(No Model.)

J. H. DAWSON.
Corn Planter and Dropper.

No. 243,431. Patented June 28, 1881.

Witnesses,
F. L. Ourand
Geo. C. Poulton

Inventor.
John Henry Dawson,
by John S. Duffie
his Attorney.

UNITED STATES PATENT OFFICE.

JOHN H. DAWSON, OF CANTON, TEXAS.

CORN PLANTER AND DROPPER.

SPECIFICATION forming part of Letters Patent No. 243,431, dated June 28, 1881.

Application filed May 7, 1881. (No model.)

*To all whom it may concern:*

Be it known that I, JOHN HENRY DAWSON, a citizen of the United States, residing at Canton, in the county of Van Zandt and State of Texas, have invented certain new and useful Improvements in Corn Planters or Droppers; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
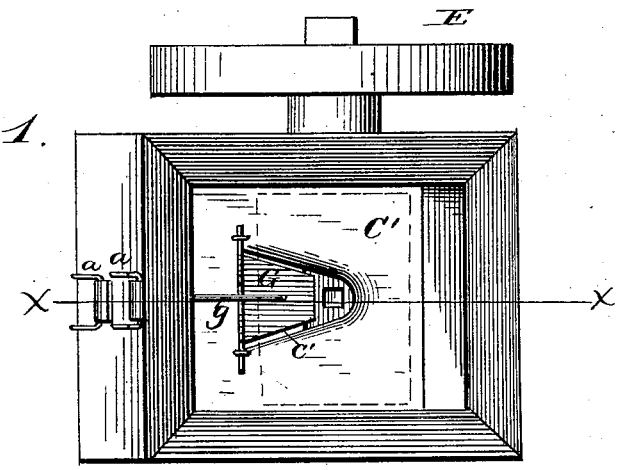
Figure 2:
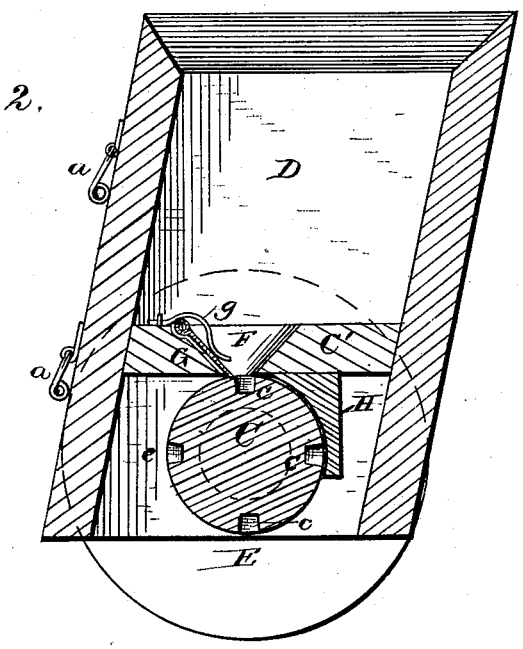

Figure 1 is a top view of the hopper, showing the partition, feed-opening, and valve with its spring. Fig. 2 is a vertical section on line $x\ x$, Fig. 1.

This invention has relation to improvements in seed-droppers; and it consists in the construction and novel arrangement of parts, as hereinafter shown, described, and more particularly pointed out in the claims.

In the accompanying drawings, the letter D designates my improved seed box or hopper, hinged by means of staples $a\ a$ to the rear side of any plow-standard in such a manner that the box can move freely up and down and to the right or left by means of said staples. Through the lower end of said box D passes a shaft, C, provided with cups $c$, formed at suitable intervals on its periphery, and having upon one end, outside of the box, a driving-wheel, E, arranged to travel on the ground.

Secured to the inside of the hopper and to the side and end walls thereof, immediately above the shaft, is a partition, C', having a bevel countersunk opening, F, provided with an inclined recess, $c'$, extending down to the bottom of the opening. This partition C' is provided with a cut-off gate, G, hinged to its upper surface and snugly seated in said recess, the lower edge of which projects through the bottom of the opening F and rests on the shaft C. There is also secured to the partition C' a controlling-spring, $g$, having its bearing on the central portion of the gate, whereby the said gate is kept down to its work, and as the shaft rotates by the action of its wheel E the flow of seed is cut off into the cups by the gate passing directly over them.

To the rear of the shaft, and between the side walls of the hopper, is a partition, H, which, in connection with the partition C', forms a concave that exactly fits the periphery of the shaft C.

It will readily be seen that I employ no other mechanism to operate the dropper than the wheel E.

I am aware that a plow-beam has been provided with a hopper having arranged in an aperture in its bottom a roller having cups in its periphery, and a curved gate provided with a spring in said aperture is not new, and I do not claim such invention, broadly.

What I claim, and desire to secure by Letters Patent, is—

In combination with the hopper D, the shaft C, provided with cups $c$, the partition C', having the bevel countersunk opening F, provided with recess $c'$, the gate G, hinged in said recess and held in contact with the cups on the shaft by spring $g$, and the concave partition H, fitting the periphery of said shaft, the whole constructed and arranged to operate by means of the wheel E, as described.

In testimony whereof I affix my signature in presence of two witnesses.

JOHN HENRY DAWSON.

Witnesses:
 A. R. GILLIAM,
 C. L. LANDRUM.